US009927917B2

(12) United States Patent
Gunawardana et al.

(10) Patent No.: US 9,927,917 B2
(45) Date of Patent: Mar. 27, 2018

(54) MODEL-BASED TOUCH EVENT LOCATION ADJUSTMENT

(71) Applicant: Microsoft Technology Licensing, LLC, Redmond, WA (US)

(72) Inventors: Asela Gunawardana, Seattle, WA (US); Timothy S. Paek, Sammamish, WA (US); Vishwas Kulkarni, Woodinville, WA (US); Dmitry Rudchenko, Bellevue, WA (US); Devlin Bentley, Kirkland, WA (US); David Nelson, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 14/927,397

(22) Filed: Oct. 29, 2015

(65) Prior Publication Data

US 2017/0123586 A1    May 4, 2017

(51) Int. Cl.
*G06F 15/18* (2006.01)
*G06F 17/15* (2006.01)
(Continued)

(52) U.S. Cl.
CPC ............ *G06F 3/0418* (2013.01); *G06F 3/017* (2013.01); *G06F 3/0237* (2013.01); *G06F 3/041* (2013.01);
(Continued)

(58) Field of Classification Search
CPC ........ G06F 3/017; G06F 3/0237; G06F 3/041; G06F 3/0416; G06F 3/0418;
(Continued)

(56) References Cited

U.S. PATENT DOCUMENTS 4,745,565 A * 5/1988 Garwin ................. G06F 3/0414
  178/18.02
5,875,108 A * 2/1999 Hoffberg .................. G06F 3/00
  382/181

(Continued)

FOREIGN PATENT DOCUMENTS

CN    102929429 A    2/2013

OTHER PUBLICATIONS

"Touch Drive Architecture (Compact 2013)", Microsoft, Mar. 26, 2014, 2 pages.

(Continued)

*Primary Examiner* — Michael J Eurice
(74) *Attorney, Agent, or Firm* — Lempia Summerfield Katz LLC

(57) ABSTRACT

An electronic device includes a display including a touch sensor, a contextual sensor configured to provide data indicative of an operating condition of the electronic device, one or more memories in which touch input instructions, touch event mapping instructions, and a touch event mapping model are stored, and a processor coupled to the memory. The processor is configured through execution of the touch input instructions to obtain data indicative of an initial assessment of touch event position via the touch sensor. The touch event mapping model maps the initial assessment of touch event position to an adjusted touch event position as a function of the data indicative of the operating condition of the electronic device. The processor is further configured through execution of the touch event mapping instructions to determine the adjusted touch event position based on the touch event mapping model, the data indicative of the initial assessment of touch event position, and the data indicative of the operating condition.

22 Claims, 4 Drawing Sheets

(51) Int. Cl.
*G06F 17/17* (2006.01)
*G06F 17/18* (2006.01)
*G06F 3/041* (2006.01)
G06N 99/00 (2010.01)
G06F 3/01 (2006.01)
G06K 9/62 (2006.01)
G06F 11/34 (2006.01)
G06F 3/023 (2006.01)
G06F 3/0488 (2013.01)

(52) U.S. Cl.
CPC ........ *G06F 3/0416* (2013.01); *G06F 3/04883* (2013.01); *G06F 11/3447* (2013.01); *G06F 17/18* (2013.01); *G06K 9/6267* (2013.01); *G06K 9/6296* (2013.01); *G06K 9/6297* (2013.01); *G06N 99/005* (2013.01)

(58) Field of Classification Search
CPC .. G06F 3/04883; G06F 11/3447; G06F 17/18; G06K 9/6267; G06K 9/6296; G06K 9/6297; G06N 99/005
See application file for complete search history.

(56) References Cited

U.S. PATENT DOCUMENTS

| | | | | |
|---|---|---|---|---|
| 5,901,246 A * | 5/1999 | Hoffberg | ............... | G06F 9/4446 382/209 |
| 6,081,750 A * | 6/2000 | Hoffberg | ................... | G06F 3/00 345/520 |
| 6,400,996 B1 * | 6/2002 | Hoffberg | ............ | G05B 19/0426 370/218 |
| 6,418,424 B1 * | 7/2002 | Hoffberg | ................... | G06F 3/00 386/E5.004 |
| 7,136,710 B1 * | 11/2006 | Hoffberg | ............... | G06F 3/0482 382/155 |
| 7,236,161 B2 | 6/2007 | Geaghan | | |
| 8,314,775 B2 | 11/2012 | Westerman et al. | | |
| 8,493,332 B2 | 7/2013 | D'Souza | | |
| 8,587,562 B2 | 11/2013 | Goertz et al. | | |
| 8,614,693 B2 | 12/2013 | King et al. | | |
| 8,907,930 B2 | 12/2014 | Alberth et al. | | |
| 2003/0191608 A1 * | 10/2003 | Anderson | ............. | G06F 11/328 702/189 |
| 2003/0204382 A1 * | 10/2003 | Julier | ...................... | G06F 17/18 702/196 |
| 2004/0181335 A1 * | 9/2004 | Kim | ....................... | G01C 21/30 701/472 |
| 2005/0065721 A1 * | 3/2005 | Herrtwich | ............ | G01C 21/365 701/408 |
| 2005/0146513 A1 * | 7/2005 | Hill | ....................... | G06F 3/0436 345/173 |
| 2006/0238518 A1 * | 10/2006 | Westerman | ........... | G06F 3/0235 345/173 |
| 2007/0061735 A1 * | 3/2007 | Hoffberg | ............... | G06F 9/4443 715/744 |
| 2007/0128899 A1 * | 6/2007 | Mayer | ................... | G06F 9/4406 439/152 |
| 2008/0158146 A1 * | 7/2008 | Westerman | ........ | G06K 9/00375 345/156 |
| 2008/0177994 A1 * | 7/2008 | Mayer | ................... | G06F 9/4418 713/2 |
| 2009/0066674 A1 * | 3/2009 | Maharyta | ............ | G06F 3/03547 345/178 |
| 2009/0256817 A1 * | 10/2009 | Perlin | ................... | G06F 3/0233 345/174 |
| 2010/0149103 A1 | 6/2010 | Betts-LaCroix | | |
| 2011/0037778 A1 | 2/2011 | Deng et al. | | |
| 2011/0043475 A1 | 2/2011 | Rigazio et al. | | |
| 2011/0242038 A1 * | 10/2011 | Kakuta | ................. | G06F 3/0418 345/173 |
| 2013/0093698 A1 * | 4/2013 | Ichiboshi | ................ | G06F 3/041 345/173 |
| 2013/0234977 A1 * | 9/2013 | Lin | ......................... | G06F 3/044 345/174 |
| 2013/0342501 A1 * | 12/2013 | Molne | ................... | G06F 3/0414 345/174 |
| 2014/0035805 A1 * | 2/2014 | Minnen | .................. | G06F 3/017 345/156 |
| 2014/0105457 A1 * | 4/2014 | Metzler | ..................... | G01C 1/04 382/103 |
| 2014/0132551 A1 * | 5/2014 | Bathiche | ............... | G06F 3/0488 345/174 |
| 2014/0168112 A1 | 6/2014 | Kim et al. | | |
| 2014/0195988 A1 * | 7/2014 | Kramer | .................... | G06F 3/017 715/863 |
| 2014/0201126 A1 * | 7/2014 | Zadeh | .................... | G06K 9/627 706/52 |
| 2014/0240231 A1 * | 8/2014 | Minnen | ................... | G06F 3/017 345/158 |
| 2014/0325373 A1 * | 10/2014 | Kramer | .................... | G06F 3/017 715/740 |
| 2014/0364227 A1 * | 12/2014 | Langlois | ................. | A63F 13/00 463/32 |
| 2015/0002479 A1 * | 1/2015 | Kawamura | ........... | G06F 3/0414 345/178 |
| 2015/0077326 A1 * | 3/2015 | Kramer | ................. | G06F 3/0325 345/156 |
| 2015/0091859 A1 * | 4/2015 | Rosenberg | ............. | G06F 3/044 345/174 |
| 2015/0138086 A1 * | 5/2015 | Underkoffler | ........... | G06F 3/017 345/158 |
| 2015/0153897 A1 * | 6/2015 | Huang | ................... | G06F 3/0481 345/173 |
| 2015/0234519 A1 * | 8/2015 | Gowreesunker | ........ | G06F 3/044 345/174 |
| 2015/0237183 A1 * | 8/2015 | Novet | ............... | H04M 1/72569 455/556.1 |
| 2015/0310656 A1 * | 10/2015 | Otto | ................... | G06K 9/00342 345/420 |
| 2015/0378510 A1 * | 12/2015 | Cheong | ................. | G06F 3/0416 345/178 |
| 2016/0092023 A1 * | 3/2016 | Nakaya | ................. | G06F 3/0418 345/173 |
| 2016/0256223 A1 * | 9/2016 | Haimerl | .................. | A61B 34/20 |
| 2017/0083115 A1 * | 3/2017 | Speck | .................... | G06F 3/011 |
| 2017/0109578 A1 * | 4/2017 | Bednarowicz | ..... | G06K 9/00476 |
| 2017/0123593 A1 * | 5/2017 | Send | .................... | G06F 3/0421 |

OTHER PUBLICATIONS

Louis Kratz et al., "Making Gestural Input from Arm-Worn Inertial Sensors More Practical", In Proceedings of the ACM SIGCHI Conference on Human Factors in Cornupting Systems, May 5, 2012, 4 pages.

Robert Jania, "Efficient Tuning of Capacitive Sensing Designs", TechZone magazine, Oct. 2011, 5 pages.

* cited by examiner

MODEL-BASED TOUCH EVENT LOCATION ADJUSTMENT

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
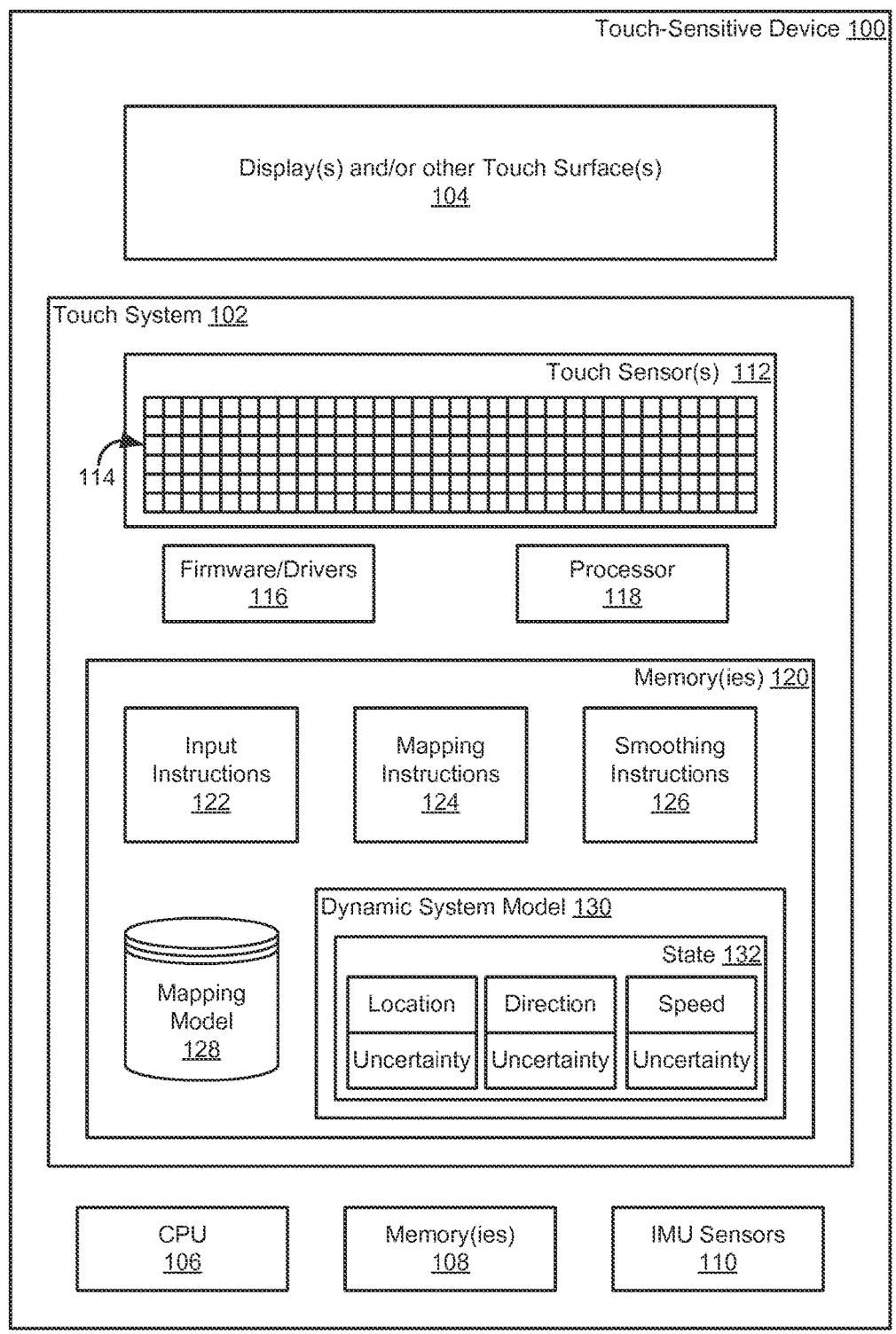
FIG. 1 is a block diagram of an electronic device configured for model-based touch event location adjustment in accordance with one example.

The embodiments of the disclosed devices and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION

Mobile devices with small touchscreens often call for precision touch sensing. For instance, text input and selection on a small touchscreen involves reasonably accurate touch sensing. Reliance on large text and icons would undesirably consume a large percentage of the display.

Unfortunately, precise touch sensing is challenging for many mobile devices, such as phones and wrist-worn wearable devices (e.g., fitness bands and watches). The user and the mobile device may be in motion (e.g., walking) during user interaction with the touchscreen. The variance in the orientation of the mobile device may also lead to inaccuracies in touch sensing.

The variance in motion and orientation causes user perception to depart from the reality of the user interaction with the touchscreen. Where users believe they are touching may be different from where the touch system detects their touches. The discrepancy may increase with decreasing display size. The relative size of the user's finger increases with respect to the touch sensor array. Moreover, devices with smaller displays are more likely to undergo more variance in orientation and movement during use.

Electronic devices are configured to adjust touch event location to accommodate the variance in motion, orientation, and other operating conditions. The electronic devices allow users to accurately interact with the touchscreen without having to resort to user interfaces designed for very sloppy touch through, for instance, large icons and text. A more consistent user experience is thereby provided.

The touch event adjustments may enable the use of less precise touch sensing components. Manufacturing costs are accordingly decreased. The components may also achieve lower power consumption, which, in turn, leads to increased battery life.

The adjusted touch event location may be provided via an additional calibration, or recalibration, layer. For example, the adjustment layer may reside between touch system firmware and a touch system software development kit (SDK) unit. The touch system firmware may apply a base or primary calibration routine to the raw data captured by the touch sensor(s). The additional calibration layer may be considered a de-warping layer, e.g., a layer that removes any warping effected by the operating condition(s) for the electronic device.

The adjustment layer is provided by a model that maps touch event location to an intended touch event location. The mapping may be based on data indicative of the operating condition(s). The operating condition data may be provided by one or more contextual sensors of the electronic device. The mapping may alternatively or additionally adjust the intended touch event location to correct for the curvature of the finger. Such correction may be useful due to the form factor other characteristics of the touchscreen. The model may be a machine-learned model derived from a data collection in which touch event positions record where users believe they are tapping or otherwise interacting with the touchscreen. The model may be constructed in a tree configuration, such as a single regression tree, or a set of regression trees, such as a boosted regression tree.

The data provided by the contextual sensor(s) allows the touch event location adjustments to be form factor-aware. For instance, the touch event locations may be adjusted to reflect the bending of a flexible device. The mapping may thus compensate for the operating conditions, or operational realities, in which data is captured by the touch sensor.

In some cases, the model maps the touch event position adjustments as a function of inertial measurement unit (IMU) data. The IMU data may be indicative of varying orientations and movements. Although described in connection with IMU-based warping effects, the electronic devices are not limited to IMU data-based adjustments. For instance, the warping may arise from other operating conditions, such as flexure or other bending of the touchscreen. One or more sensors may be configured to detect the extent to which the electronic device is bent while the touch event location is determined.

The model-based adjustments may also be directed to removing jitter in touch sequences. The touch sequences may be indicative of gestures, such as a swipe. Jitter corresponds with the errors in reported touch event positions as a swiping finger moves in a relatively smooth and straight line. The electronic devices may implement alternative or additional model-based adjustments to stabilize or smooth such touch sequences. The smoothing is provided by a dynamic system model, such as a Kalman filter or Hidden Markov Model (HMM). The dynamic system model uses past touch event data to predict a touch event location of the next touch event in a series or sequence. The predicted touch event location may then be used to adjust the touch event position data reported by the touch sensor. In some cases, the dynamic system model is applied after de-warping or recalibration by the mapping model of the reported touch event position data. In other cases, the model-based smoothing of the dynamic system model is applied independently of de-warping.

The recalibration provided by the other model-based adjustments may also help remove or reduce jitter. The recalibration may reduce jitter in the event that the operating conditions cause the user to not swipe in a relatively straight line. The model-based recalibration corrects the individual touch events of such touch sequences for such context-based errors, leading to, for instance, a straighter line of touch event positions for the swipe gesture.

The dynamic system modeling utilized by the electronic devices is not limited to addressing jitter. Other types or sources of touch controller noise may be addressed by the dynamic system model. Various types of errors may be addressed. The error may be present in the centroid weight reported for each touch event. But the error may reflect additional or alternative differences between the actual and intended touch positions.

FIG. 1 depicts an electronic device 100 configured to implement model-based touch event location adjustment. The device 100 includes a touch system 102 and a touch-sensitive surface 104. The touch system 102 and/or the touch-sensitive surface 104 may be part of a display, e.g., as a touchscreen or other touch-sensitive display. Any number of touch-sensitive surfaces 104 may be included. Any type of touch system 102 may be used, including, for instance, capacitive, resistive, and optical touch systems. The touch system 102 may be a force-sensitive touch system.

The device 100 includes a processor 106 and one or more memories 108. The touch system 102 may serve as an interface or other intermediary between the touch-sensitive surface 104 and an operating environment supported by the processor 106 and the memories 108. The processor 106 may be a general-purpose processor, such as a central processing unit (CPU), a graphic processing unit (GPU), or any other processor or processing unit. Any number of such processors or processing units may be included. For example, the electronic device 100 may include a separate, additional processor dedicated to handling the processing load of the touch system 102, including implementation of the model-based adjustment techniques described herein.

The device 100 may also include a number of contextual sensors 110 configured to capture or otherwise provide data indicative of one or more operating conditions of the device 100. The one or more operating conditions establish a context in which the touch system 102 operates. The operating condition(s) may thus establish the context in which the user interacts with the touch system 102. The context (and any ongoing variances therein) may thus lead the user's perception of the touch event to deviate from the actual location at which the user interacts with the touch system 102. Each contextual sensor 110 may be communicatively connected to the processor 106. The contextual sensors 110 may be integrated with the processor 106, another processor, and/or one another, to any desired extent. For example, the contextual sensors 110 may be configured as a system on a chip (SoC).

In the example of FIG. 1, the contextual sensors 110 are inertial measurement unit (IMU) sensors, such as accelerometers, gyroscopes, and magnetometers. The operating condition(s) may thus be indicative of acceleration and/or orientation of the device 100. Any combination of IMU sensors may be used to provide inertial measurement data for the device 100. Additional or alternative sensors may be included. For instance, a flexure sensor may be included to capture the extent to which (or whether) the device 100 is bent. The nature of the operating condition(s) detected by the sensor(s) 110 may thus vary.

The touch system 102 may be communicatively coupled to the processor 106 and/or the memories 108 to provide touch sensor data for a touch event. The touch event may be or include various types of user interactions with the touch-sensitive surface 104. The touch sensor data may specify or otherwise be indicative of position information for the touch event. In some cases, the touch sensor data may include other data, such as amplitude information for the user interaction, and size (e.g., area) information of the user interaction. Additional information may be provided by the touch system 102 in connection with the touch sensor data. For example, the touch sensor data may be provided with data indicative of a touch event type and/or with data identifying a particular gesture. A touch event may be tracked by the touch system 102 over time rather than identified as a new event with each detection frame or interval.

The touch system 102 includes one or more touch sensor units 112. Each touch sensor unit 112 may correspond with a respective touch-sensitive surface of the device 100. Each touch sensor unit 112 may include an array 114 (e.g., grid) of touch-sensitive elements. The configuration, construction, and other characteristics of the array 114 may vary.

In the example of FIG. 1, the touch system 102 also includes firmware and/or drivers 116, a processor 118, and one or more memories 120. The processor 118 is communicatively coupled to each memory 120 and/or the firmware/drivers 116. The processor 118 is configured to obtain touch sensor data captured via the touch-sensitive surface 104. The touch sensor data is representative of a frame or time interval sensed via the touch-sensitive surface 104. The touch sensor data for each frame may include a matrix of values, or pixels, that together form an image of the extent to which touch events are occurring at the surface 104. Touch sensor data may be provided for each pixel and/or for each user interaction. The touch sensor data may include the raw output data of the touch sensor 112 and/or include a processed representation of the raw output data.

The manner in which the touch sensor data is obtained by the processor 118 may vary. For example, the measurement data may be received via the firmware/drivers 116 and/or be obtained by accessing the memory 120. In some cases, the firmware/drivers 116 may be configured to provide or act as a touch controller. For example, the firmware/drivers 116 may be configured to compute or otherwise determine one or more components of the touch sensor data, such as centroid information, from the raw output data from the touch sensor(s) 112. Alternatively or additionally, the firmware/drivers 116 may provide analog-to-digital conversion and/or other processing of the raw output data. In some cases, one or more touch controller functions may be provided by the processor 118.

The touch sensor data may be alternatively or additionally obtained by the processor 106. In some cases, the processor 106 obtains the touch sensor data for purposes of implementing touch event location adjustments. In such cases, the processor 118 may be directed to controlling the sensor 112 and/or configured to implement one or more pre-processing or other tasks in preparation for the adjustments. The processing of the touch sensor data and other aspects of the adjustment techniques may be implemented by any combination of the processor 106 and the processor 118. In other examples, the device 100 includes a single processor (i.e., either the processor 106, the processor 118, or a different processor) for purposes of obtaining and processing the measurement data.

The touch sensor data may specify or include various position data for the user interaction. In some cases, the touch sensor data identifies a centroid or other central location for the touch event. Alternatively or additionally, the touch sensor data includes or is raw data that identifies one or more grid locations of the sensor elements of the touch-sensitive surface 104 activated or otherwise involved in the user interaction. In such cases, a centroid for the user interaction may be determined via the processor 106 or other element of the device 100 from the grid location or other position data.

The configuration and arrangement of the touch system hardware in the device 100 may vary. For example, some or all of the driver and other information provided via the firmware 116 may alternatively be stored in the memories 120.

The processor 106 and/or the processor 118 are configured to execute a number of instruction sets stored in the memory 108 and/or the memory 120. The instruction sets may be arranged as respective software modules. The modules or other instruction sets may be integrated to any desired extent. The instruction sets include input instructions 122, mapping instructions 124, and smoothing instructions 126. Additional, fewer, or alternative instruction sets or modules may be provided. For example, an additional instruction set or module may be provided for output or other reporting of adjusted touch position data. In the example of FIG. 1, instructions for reporting are an integral part of the mapping instructions 124 and/or smoothing instructions 126.

Model data for a number of models is also stored in the memory 108 and/or the memory 120. In some cases, the model data is stored in a non-volatile memory unit or circuit of the memory 108 and/or the memory 120, such as a flash memory chip. The model data is used by one or more of the instruction sets for adjustment of the touch event location. In the example of FIG. 1, model data is stored for a touch event mapping model 128 and a dynamic system model 130. The touch event mapping model 128 is used during execution of the mapping instructions 124. The dynamic system model 130 is used during execution of the smoothing instructions 126.

The processor 106 and/or the processor 118 may be configured through execution of the input instructions 122 to obtain data indicative of an initial assessment of touch event position via the touch sensor(s) 112. The initial assessment data may be obtained by receiving some or all of the touch sensor data from the touch system 102 or a component thereof. For example, the initial assessment data may be received via the firmware/drivers 116. Alternatively or additionally, the initial assessment may be obtained by accessing the memories 120 and/or the memories 108. In some cases, the initial assessment data may be obtained through processing of other touch sensor data. For example, the initial assessment of the centroid information may be obtained by analyzing the raw data, such as sensor counts or other amplitude information in view of a noise floor. In some cases, such analysis is implemented by the firmware/drivers 116 of the touch system 102.

The initial assessment data may be or include raw and/or processed data indicative of the touch event position as reported by the touch sensor 112. The raw data may be obtained for each touch sensor element of the array 114. Alternatively or additionally, the initial assessment data actually specifies the initial assessment of the touch event position. For example, the initial assessment data may specify the centroid location for the touch event.

The processor 106 and/or the processor 114 may be configured through execution of the mapping instructions 124 to determine an adjusted touch event position. The determination is based on the mapping model 128 and the initial assessment data. The determination may also be based on the data indicative of the operating condition(s). The mapping model 128 maps the initial assessment of touch event position to an adjusted touch event position that corrects for one or more factors, such as the curvature of the finger. Correction for the curvature of the finger and/or other factors may be more or less warranted given the form factor and other characteristics of the device 100.

The factor(s) may relate to, or involve, the operating conditions in which the touch event occurs. The mapping may thus be a function of the operating condition data. The mapping model 128 may thus specify an adjustment for a given initial assessment and a given operating condition dataset. The mapping may be provided as an adjustment to the touch event location. The adjustment may be expressed as a number of pixels (or elements) of the sensor array 114, such as +3.5 pixels up, and −2.7 pixels left. The end result of the mapping-based adjustments is that a given input location (x, y) is mapped to an output location (x', y') as a function of the operating condition data.

The mapping instructions 124 may utilize various types of data indicative of the initial assessment of touch event position. For example, the mapping instructions 124 may be responsive to data specifying the initial assessment, data underlying the initial assessment (e.g., the raw data), or both.

The mapping model 128 may be or include a machine-learned model. For instance, the mapping model 128 may be configured as boosted regression trees or a single regression tree, but other types of models may be used, such as neural network or linear regression models. The model may be trained by a data collection routine in which reported locations are stored during interaction with the touch system under varying operational conditions. The intended locations of the touch events are then provided in connection with the reported locations to train the model. In this way, subsequent touch events at the reported locations during similar operating conditions (or other circumstances) may then be mapped to where the user believes that the touch event is occurring. Various operational realities of the touch system may thus be incorporated into the training dataset. For example, the effects of a curved or thick touch-sensitive surface are reflected in the training dataset.

Figure 3:
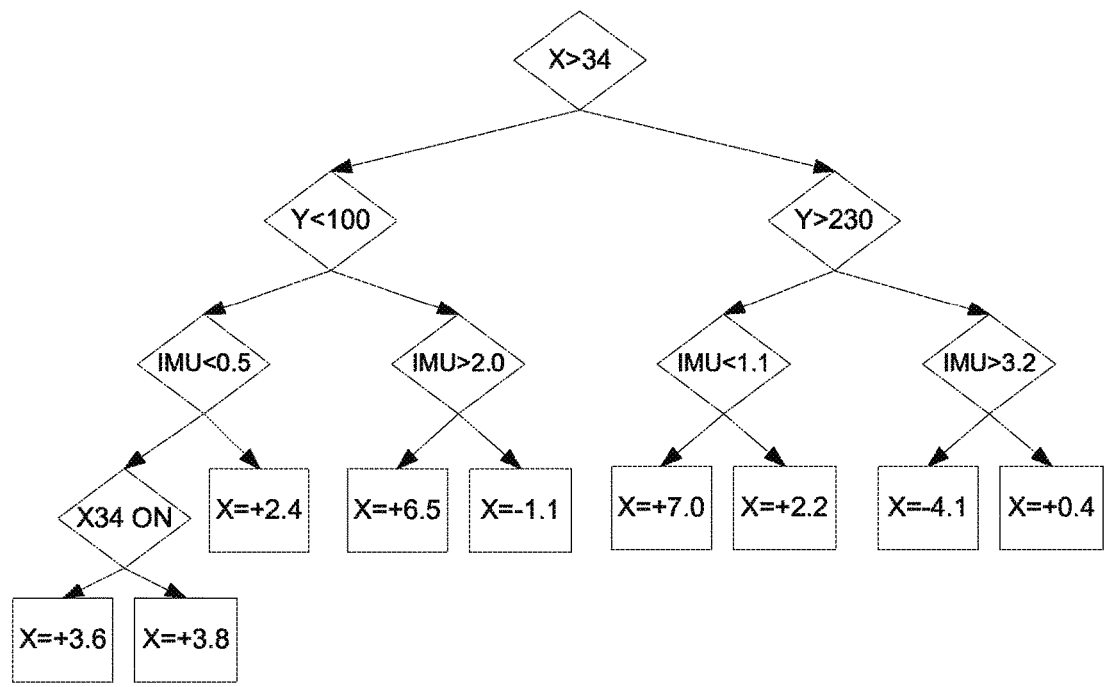
FIG. 3 is a block diagram of a regression tree of a model used to implement touch event location adjustment in accordance with one example.

A portion of an example of a regression tree is shown in FIG. 3. Each node of the regression tree leading up to a result is a binary decision block. In this example, each decision block presents a query that analyzes one or more of the following types of data: one or both of the (x, y) coordinates of the initial assessment; the raw data from the touch sensor 112; and, the data from the contextual sensor(s) 110. Progressing through the decision blocks eventually leads to a respective adjustment for one of the dimensions of the touch sensor 112. For example, for a touch event that has an initial assessment of touch event position with an X coordinate greater than 34, and a Y coordinate less than 100, an IMU data point greater than 0.5, and with node 34 of the array 114 activated, the adjustment is +3.6 pixels.

The analysis of the raw data may vary. In the example of FIG. 3, the analysis of the raw data involves determining whether a touch sensor element, or node, of the array 114 is activated. A respective branch of the regression tree may thus be selected based on whether a respective touch sensor element of the array is activated. In other cases, the raw data for a respective node may be compared to a threshold. The mapping model 128 may include decision nodes involving any combination of such analyses.

The input instructions 122 may also cause the processor 106 and/or the processor 118 to obtain a series of past observed touch event positions. A series may be captured when continuous or otherwise ongoing user interaction with the touch sensor 112 is detected. The ongoing nature of the user interaction may be representative of a gesture, such as a swipe. The series may include the touch event positions for the last several frames of touch sensor data. In that way, the use of the last several frames may include the touch events associated with the gesture.

The observed touch event positions of the series may be adjusted or non-adjusted. In some cases, the observed touch event positions may reflect the model-based adjustment effected by execution of the mapping instructions 124. But in other cases, the observed touch event positions have not been adjusted via the mapping instructions 124. The touch sensor data for the series may thus be used for further or alternative touch position adjustment.

The processor 106 and/or the processor 114 may be configured through execution of the smoothing instructions 126 to apply a dynamic system model 130 to the series of past observed touch event positions. The dynamic system model 130 is applied to smooth the touch event positions in the series to reduce jitter. The smoothing occurs via the predictive nature of the dynamic system model 130. To that end, the dynamic system model 130 has a state 132. The state 132 is determined based on the series of past observed touch event positions. The state 132 is indicative of a predicted touch event position. The accuracy of the touch event position predicted by the model increases as more past touch event data is incorporated into the model.

Application of the dynamic system model 130 provides an adjusted touch event position as a function of the predicted touch event position and the current observed touch event position. For example, the function may be or include an interpolation between the predicted touch event position and the current observed touch event position. Other functions may be used to moderate the influence of the predicted touch event position on the output reported for the touch event. For example, the function may be a non-linear combination of the predicted and observed touch event positions.

In the example of FIG. 1, the dynamic system model 130 is configured as, or includes, a Kalman filter. The state 132 includes or specifies parameters indicative of touch event location, direction, and speed, as well as uncertainty parameters indicative of the uncertainty in each one of the location, direction, and speed parameters. The dynamic system model 130 is configured such that the value of the uncertainty parameters varies in connection with how well the predicted and current observed touch event positions match. The uncertainty parameter increases and decreases as the deviation between the positions increases and decreases, respectively.

One or more of the uncertainty parameters may be used to weight the interpolation or other function used to determine the adjusted touch event position. As the uncertainty parameter increases, relatively more weight is given to the current observed touch event position. As the uncertainty parameter decreases, relatively more weight is given to the touch event position predicted by the dynamic system model 130.

Other types of dynamic system models may be used to provide the dynamic system model 130. For instance, the dynamic system model 130 may not include a predicted direction of movement and/or a predicted speed of movement. Some models may not have uncertainty parameters, or the same number of uncertainty parameters as the example of FIG. 1. In other cases, the uncertainty or variances in the parameters of the state have non-Gaussian distributions. For example, the dynamic system model 130 may be or include a Hidden Markov Model (HMM). Any type of dynamic system model may be used in which an underlying state used to predict a touch position is updated as the system observes more touch position data.

The smoothing instructions 126 may cause the processor 106 and/or the processor 118 to use the output of the mapping instructions 124 (e.g., the adjusted touch event position) as the current observed touch event position. The current observed touch event position may thus be an adjusted touch event position.

In other cases, the mapping instructions 124 or the smoothing instructions 126 are executed independently of one another. For example, the mapping instructions 124 may be executed in connection with adjustment of solitary touch events, and the smoothing instructions 126 may be executed in connection with touch event groups associated with the gesture.

Figure 2:
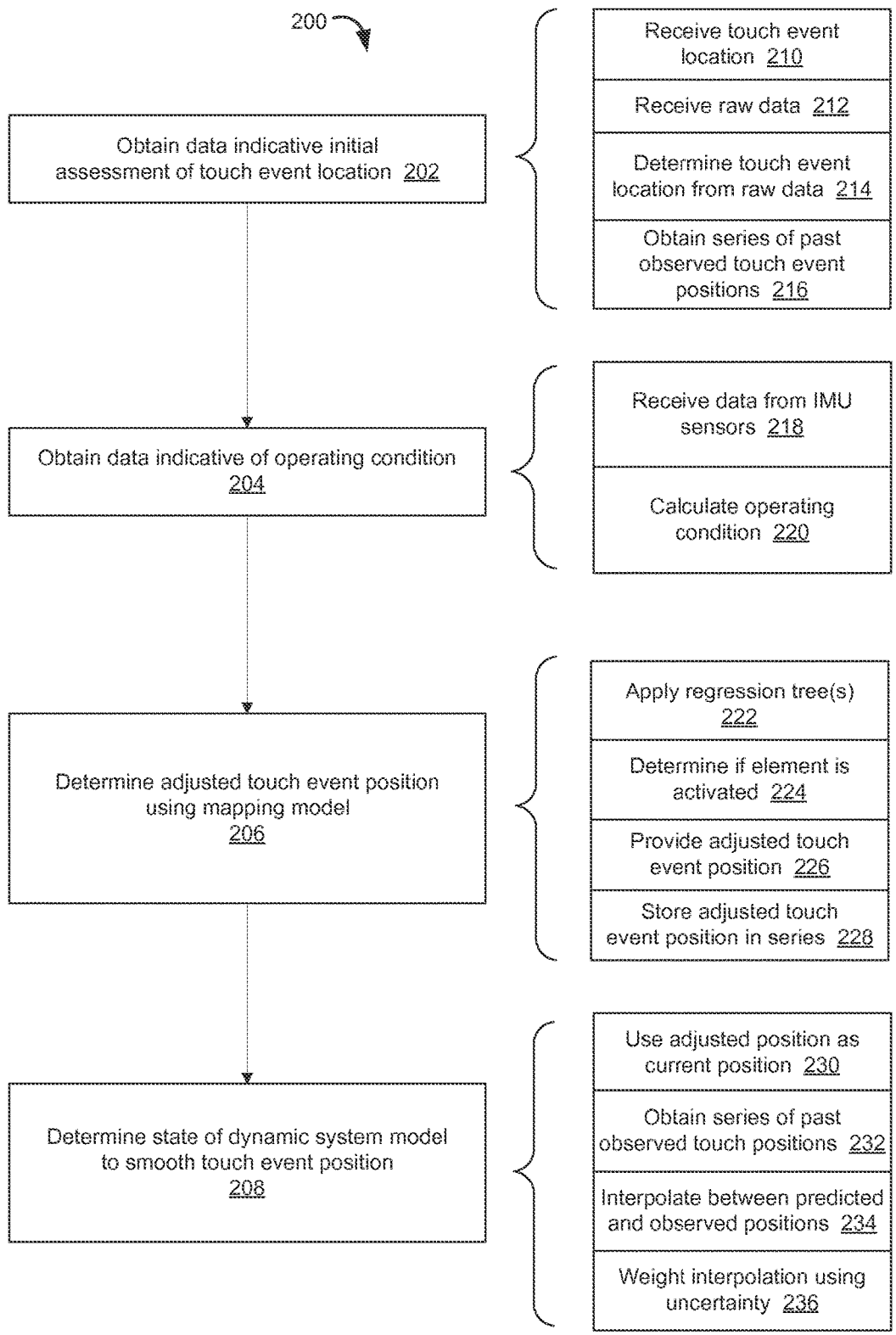
FIG. 2 is a flow diagram of a computer-implemented method for model-based touch event location adjustment in accordance with one example.

FIG. 2 depicts an exemplary method 200 for touch event location adjustment. The method is computer-implemented. For example, one or more processors of the electronic device 100 shown in FIG. 1 and/or another electronic device may be configured to implement the method or a portion thereof. The implementation of each act may be directed by respective computer-readable instructions executed by a processor of the touch system 102 (FIG. 1), the device 100, and/or another processor or processing system. Additional, fewer, or alternative acts may be included in the method. For example, the method 200 may not include acts directed to providing an output indicative of the adjusted touch event location. In some cases, operating condition data is not obtained.

The method 200 may begin with one or more acts related to capturing raw touch sensor data. The manner in which the raw touch sensor data is captured may vary. The raw touch sensor data may be captured by a different device or processor and/or in connection with a different method implemented by the same processor or device implementing the method 200. For example, the raw touch sensor data may be captured by a track pad, game controller, or other device in communication with the processor implementing the method 200.

In the example of FIG. 2, the method 200 begins with an act 202 in which data indicative of an initial assessment of touch event location is obtained for a touch event. The data may include a specification of the initial assessment itself and/or the underlying raw touch sensor data.

In act 204, operating condition data is obtained. The data may be indicative of one or more operating conditions of the touch-sensitive surface with which the user is interacting. The operating condition(s) may relate to or be otherwise indicative of the orientation and/or movement of the touch-sensitive surface. The operating condition data may be captured by one or more IMU sensors. Additional or alternative contextual sensors may be used to provide the operating condition data. For example, the operation condition data may be indicative of the extent to which the touch-sensitive surface is being flexed or bent during operation.

The method 200 then determines in an act 206 an adjusted touch event position using a mapping model. The operating condition data may also be used. The mapping model provides an adjustment to the touch event position as a function of the operating condition data and the data indicative of the initial assessment of the touch event location, as described above. The mapping model may be a machine-learned model.

In the example of FIG. 2, the state of a dynamic system model is then determined in an act 208 to smooth a series of touch event positions. The smoothing removes jitter that may be otherwise present as the touch system captures the individual touch events of a gesture. The state of the dynamic system model predicts the position of the next touch event in the series. The predicted position may then be used in conjunction with the observed touch position for the next touch event to provide an adjusted touch event position for the next touch event. The dynamic system model may then be updated in accordance with the degree to which the predicted and observed positions match.

Implementation of the act 208 may involve, be or include an iterative process. After determination of the state of the dynamic system model, further touch position data is obtained. The further touch position data adds to the series of touch event positions already incorporated into the dynamic system model. The observed touch position presented by the further data is then compared with the touch position predicted by the state of the dynamic system model. The results of the comparison may then be used to update the state. The process may then repeat with each frame of additional touch position data having another touch event in the series.

Obtaining data in the act 202 may include receiving the touch event location in an act 210 and/or the raw data in an act 212. The data may be received from the touch sensor or a component thereof. The act 202 alternatively includes capturing the touch event location and/or raw data in other cases, such as those in which the method 200 is implemented by the touch system. In such and other cases, the act 202 may include determining the touch event location in an act 214 from the raw data. The act 202 may alternatively or additionally include obtaining data indicative of a series of past observed touch event positions in an act 216 to support the removal of jitter in the series.

The act 204 may include receiving the operating condition data from IMU sensors and/or other contextual sensors in an act 218. The operating condition data may be received from one or more contextual sensors. Alternatively or additionally, the operating condition data is calculated in an act 220 from the data received from the contextual sensors.

The adjustment determination of the act 206 may include the application in an act 222 of a regression tree as the model. In cases in which raw sensor data is involved, application of the regression tree and/or other model may include determining in an act 224 if a node or element of the touch sensor array is activated.

The touch position output of the adjustment determination may be provided in an act 226 as an individual adjusted touch event position. Alternatively or additionally, the output is stored in an act 228 as part of a series of touch events. The series may then be used as the input to the smoothing operation implemented in the act 208.

The model-based smoothing of the act 208 may use in an act 230 the adjusted position data from the act 206 for the current (or observed) touch event positions. In other cases, the series of past observed touch positions is received or otherwise obtained in an act 232.

The smoothing may include interpolating in an act 234 between the touch event position predicted by the dynamic system model utilized in the act 208 and the observed touch position. The terms of the interpolation may be weighted in an act 236 using an uncertainty parameter developed by the dynamic system model.

The order of the acts of the method may vary from the example shown. For example, in some cases, the operating condition data may be obtained via the act 204 before the touch sensor data is obtained via the act 202. Some of the acts may alternatively be implemented in parallel or concurrently. For example, the acts 202 and 204 may be implemented concurrently.

Figure 4:
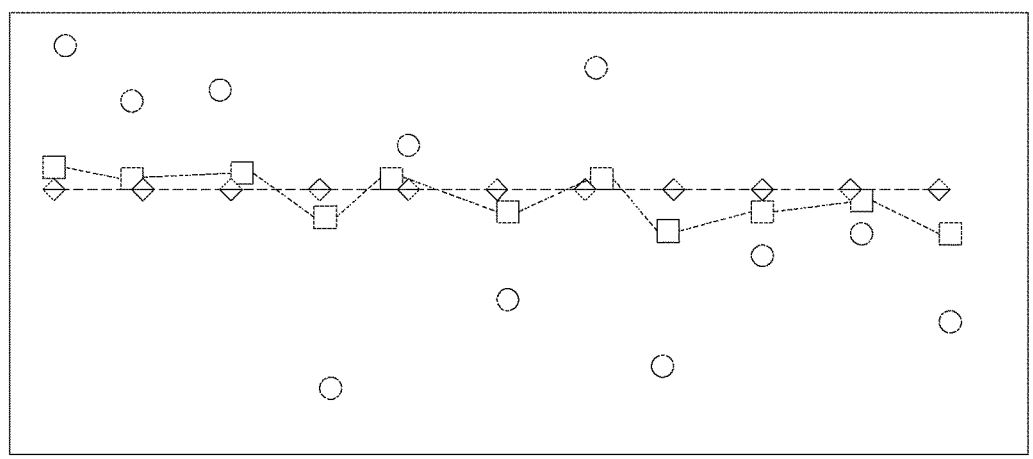
FIG. 4 is a schematic view of a series of touch event locations shown both before and after model-based touch event location adjustment in accordance with one example.

FIG. 4 depicts a set of touch event locations before and after the above-described model-based touch position adjustments. The set of touch events correspond with a user swiping across the touch-sensitive surface in a straight line. The swipe gesture may or may not occur at a relatively uniform speed. The straight line is represented in FIG. 4 by a dashed line.

The touch positions as detected by a touch system are depicted as circles. The location of each individual touch event is then adjusted through application of a machine-learned model, such as boosted regression trees or single regression tree, based on operating condition data. Taking the operating condition data into account leads to adjusting each individual touch event position to where the user intended to interact with the touch-sensitive surface. The resulting touch event positions are depicted as squares.

The series of mapping-adjusted touch event locations is then processed by the dynamic system model for further model-based adjustments. The further adjustments are directed to smoothing the series to remove the jitter that would appear as the cursor (or other user interface element) transitions between the touch positions represented by the squares. FIG. 4 depicts an ideal case in which the smoothing results in removal of all (or virtually all) of the jitter. The series of touch positions reported to the operating system (or otherwise provided as output) are depicted as diamonds arranged along the dashed line of the swipe gesture. In this example, the diamonds are equally spaced, thereby reflecting a uniform speed of the swipe gesture.

Described above are model-based techniques for adjusting reported touch positions. The adjustments provide a more consistent user experience by moving the touch event position to where the user thinks or perceives the interaction is occurring. The user may perceive the interaction differently due to the orientation and/or movement of the device. The adjustments may thus be reflected during use when the position of a touch event changes due to varying orientation and/or movement, despite the touch event having a constant, actual location. For instance, when a robot with a fine finger tip touches a touch-sensitive surface, the touch event position varies depending on the orientation and/or movement of the device.

The instructions described herein for implementing the model-based adjustments may be stored in different types of memories and hardware. In some cases, the instructions are stored in firmware, which may or may not be rewritable. In other cases, the instructions may be stored in a memory integrated with a processor and/or other components as a system on a chip (SoC). In still other cases, the instructions are stored in dynamic memory. Any combination of these and other storage options may be used.

Figure 5:
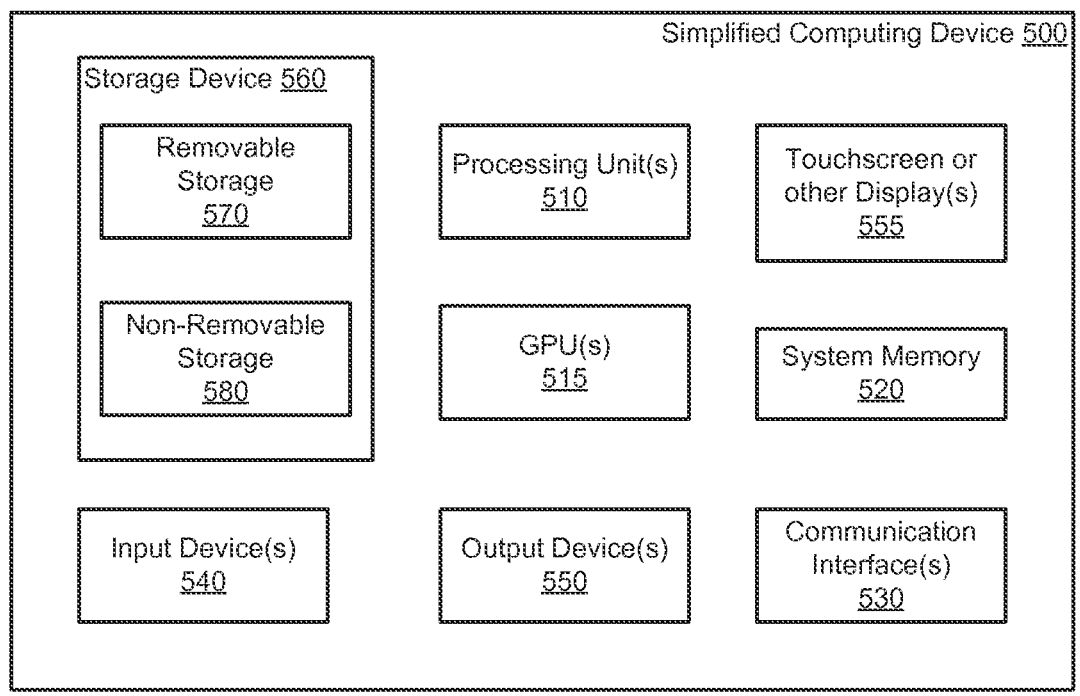
FIG. 5 is a block diagram of a computing environment in accordance with one example for implementation of the model-based touch event location adjustment.

With reference to FIG. 5, an exemplary computing environment 500 may be used to implement one or more aspects or elements of the above-described methods, devices, and/or systems. The computing environment 500 may be used by, incorporated into, or correspond with, the electronic device 100 (FIG. 1) or one or more elements thereof. For example, the computing environment 500 may be used to implement the touch system 102 (FIG. 1) or a host device or system in communication with the touch system 102. The computing environment 500 may be a general-purpose computer system used to implement one or more of the acts described in connection with FIG. 2. The computing environment 500 may correspond with one of a wide variety of computing devices, including, but not limited to, personal computers (PCs), tablet and other handheld computing devices, wearable computers, laptop or mobile computers, communications devices such as mobile phones, multiprocessor systems, microprocessor-based systems, set top boxes, programmable consumer electronics, network PCs, minicomputers, mainframe computers, audio or video media players, and game consoles.

The computing environment 500 has sufficient computational capability and system memory to enable basic computational operations. In this example, the computing environment 500 includes one or more processing unit(s) 510, which may be individually or collectively referred to herein as a processor. The computing environment 500 may also include one or more graphics processing units (GPUs) 515. The processor 510 and/or the GPU 515 may include integrated memory and/or be in communication with system memory 520. The processor 510 and/or the GPU 515 may be a specialized microprocessor, such as a digital signal processor (DSP), a very long instruction word (VLIW) processor, or other microcontroller, or may be a general purpose central processing unit (CPU) having one or more processing cores. The processor 510, the GPU 515, the system memory 520, and/or any other components of the computing environment 500 may be packaged or otherwise integrated as a system on a chip (SoC), application-specific integrated circuit (ASIC), or other integrated circuit or system.

The computing environment 500 may also include other components, such as, for example, a communications interface 530. One or more computer input devices 540 (e.g., pointing devices, keyboards, audio input devices, video input devices, haptic input devices, devices for receiving wired or wireless data transmissions, etc.) may be provided. The input devices 540 may include one or more touch-sensitive surfaces, the responses of which may be adjusted as described herein. Various output devices 550, including touchscreen or touch-sensitive display(s) 555, may also be provided. The touchscreen or touch-sensitive display 555 may include one or more touch sensors, the responses of which may be adjusted as described herein. The output devices 550 may include a variety of different audio output devices, video output devices, and/or devices for transmitting wired or wireless data transmissions.

The computing environment 500 may also include a variety of computer readable media for storage of information such as computer-readable or computer-executable instructions, data structures, program modules, or other data. Computer readable media may be any available media accessible via storage devices 560 and includes both volatile and nonvolatile media, whether in removable storage 570 and/or non-removable storage 580.

Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the processing units of the computing environment 500.

The touch event location adjustment techniques described herein may be implemented in computer-executable instructions, such as program modules, being executed by the computing environment 500. Program modules include routines, programs, objects, components, data structures, etc., that perform particular tasks or implement particular abstract data types. One or more aspects of the techniques described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices.

The techniques may be implemented, in part or in whole, as hardware logic circuits or components, which may or may not include a processor. The hardware logic components may be configured as Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and/or other hardware logic circuits.

In one aspect, an electronic device includes a display including a touch sensor, a contextual sensor configured to provide data indicative of an operating condition of the electronic device, one or more memories in which touch input instructions, touch event mapping instructions, and a touch event mapping model are stored, and a processor coupled to the memory. The processor is configured through execution of the touch input instructions to obtain data indicative of an initial assessment of touch event position via the touch sensor. The touch event mapping model maps the initial assessment of touch event position to an adjusted touch event position as a function of the data indicative of the operating condition of the electronic device. The processor is further configured through execution of the touch event mapping instructions to determine the adjusted touch event position based on the touch event mapping model, the data indicative of the initial assessment of touch event position, and the data indicative of the operating condition.

In another aspect, an electronic device includes a display including a touch sensor, an inertial measurement sensor configured to provide inertial measurement data for the electronic device, one or more memories in which instructions and a touch event mapping model are stored, and a processor coupled to the memory. The processor is configured through execution of the instructions to obtain an initial assessment of touch event position via the touch sensor. The touch event mapping model maps the initial assessment of touch event position to an adjusted touch event position as a function of the data indicative of the operating condition of the electronic device. The processor is further configured through execution of the instructions to provide the adjusted touch event position based on the touch event model and the initial touch event position.

In yet another aspect, an electronic device includes a display including a touch sensor, one or more memories in which touch input instructions and model-based touch event adjustment instructions are stored, and a processor coupled to the memory. The processor is configured through execution of the touch input instructions to obtain, via the touch sensor, a series of past observed touch event positions and a current observed touch event position. The processor is further configured through execution of the model-based touch event adjustment instructions to determine a state of a dynamic system model based on the series of past observed touch event positions. The state is indicative of a predicted touch event position. The processor is further configured through execution of the model-based touch event adjustment instructions to provide an adjusted touch event position as a function of the predicted touch event position and the current observed touch event position.

In still yet another aspect, an electronic device includes a display including a touch sensor, one or more memories in which touch input instructions and model-based touch event adjustment instructions are stored, and a processor coupled to the memory. The processor is configured through execution of the touch input instructions to obtain data indicative of an initial assessment of touch event position via the touch sensor. The touch event mapping model maps the initial assessment of touch event position to an adjusted touch event position to correct for finger curvature. The processor is further configured through execution of the touch event mapping instructions to determine the adjusted touch event position based on the touch event mapping model and the data indicative of the initial assessment of touch event position.

In connection with any one of the aforementioned aspects, the systems, devices, and/or methods described herein may alternatively or additionally include any combination of one or more of the following aspects or features. The contextual sensor includes an inertial measurement sensor such that the operating condition is indicative of acceleration and/or orientation of the electronic device. The touch sensor includes an array of touch sensor elements, and the data indicative of the initial assessment of touch event position includes raw data for each touch sensor element of the array. The data indicative of the initial assessment of touch event position specifies the initial assessment of touch event position, the touch sensor includes an array of touch sensor elements, the processor is further configured through execution of the touch input instructions to obtain raw data for each touch sensor element of the array, and the processor is further configured through execution of the touch event mapping instructions to determine the adjusted touch event position based on the raw data and the data indicative of the initial assessment of touch event position. The touch event mapping model includes a set of boosted regression trees. The touch event mapping model is configured as a regression tree. The touch sensor includes an array of touch sensor elements, and the regression tree includes a node at which a respective branch of the regression tree is selected based on whether a respective touch sensor element of the array is activated. Touch event smoothing instructions are stored in the one or more memories. The processor is configured through execution of the touch input instructions to obtain a series of past observed touch event positions, and the processor is configured through execution of the touch event smoothing instructions to determine a state of a dynamic system model based on the series of past observed touch event positions, the state being indicative of a predicted touch event position, and to provide a smoothed touch event position as a function of the predicted touch event position and a current observed touch event position. The processor is configured through execution of the touch event smoothing instructions to use the adjusted touch event position as the current observed touch event position. The one or more memories include a non-volatile memory in which the touch event mapping model is stored. The touch event mapping model maps the initial assessment of touch event position to the adjusted touch event position to correct for finger curvature. The function includes an interpolation between the predicted touch event position and the current observed touch event position. The state of the dynamic system model includes an uncertainty parameter, and the interpolation is weighted in accordance with the uncertainty parameter. The state of the dynamic system model is further indicative of a predicted direction of movement for the series of past observed touch event positions and a predicted speed of movement for the series of past observed touch event positions. The dynamic system model includes a Kalman filter or a Hidden Markov model.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. An electronic device comprising:
   a display comprising a touch sensor;
   a contextual sensor configured to provide data indicative of an operating condition of the electronic device;
   one or more memories in which touch input instructions, touch event mapping instructions, and a touch event mapping model are stored; and
   a processor coupled to the memory, the processor configured through execution of the touch input instructions to obtain data indicative of an initial assessment of touch event position via the touch sensor;
   wherein the touch event mapping model maps the initial assessment of touch event position to an adjusted touch event position as a function of the data indicative of the operating condition of the electronic device, and
   wherein the processor is further configured through execution of the touch event mapping instructions to determine the adjusted touch event position based on the touch event mapping model, the data indicative of the initial assessment of touch event position, and the data indicative of the operating condition.

2. The electronic device of claim 1, wherein the contextual sensor comprises an inertial measurement sensor such that the operating condition is indicative of acceleration and/or orientation of the electronic device.

3. The electronic device of claim 1, wherein:
   the touch sensor comprises an array of touch sensor elements; and
   the data indicative of the initial assessment of touch event position comprises raw data for each touch sensor element of the array.

4. The electronic device of claim 1, wherein:
   the data indicative of the initial assessment of touch event position specifies the initial assessment of touch event position;
   the touch sensor comprises an array of touch sensor elements;
   the processor is further configured through execution of the touch input instructions to obtain raw data for each touch sensor element of the array; and
   the processor is further configured through execution of the touch event mapping instructions to determine the adjusted touch event position based on the raw data and the data indicative of the initial assessment of touch event position.

5. The electronic device of claim 1, wherein the touch event mapping model comprises a set of boosted regression trees.

6. The electronic device of claim 1, wherein the one or more memories comprise a non-volatile memory in which the touch event mapping model is stored.

7. The electronic device of claim 1, wherein the touch event mapping model maps the initial assessment of touch event position to the adjusted touch event position to correct for finger curvature.

8. The electronic device of claim 1, wherein the touch event mapping model is configured as a regression tree.

9. The electronic device of claim 8, wherein:
the touch sensor comprises an array of touch sensor elements; and
the regression tree comprises a node at which a respective branch of the regression tree is selected based on whether a respective touch sensor element of the array is activated.

10. The electronic device of claim 1, wherein:
touch event smoothing instructions are stored in the one or more memories;
the processor is configured through execution of the touch input instructions to obtain a series of past observed touch event positions; and
the processor is configured through execution of the touch event smoothing instructions to determine a state of a dynamic system model based on the series of past observed touch event positions, the state being indicative of a predicted touch event position, and to provide a smoothed touch event position as a function of the predicted touch event position and a current observed touch event position.

11. The electronic device of claim 10, wherein the processor is configured through execution of the touch event smoothing instructions to use the adjusted touch event position as the current observed touch event position.

12. An electronic device comprising:
a display comprising a touch sensor;
an inertial measurement sensor configured to provide inertial measurement data for the electronic device;
one or more memories in which instructions and a touch event mapping model are stored; and
a processor coupled to the memory, the processor configured through execution of the instructions to obtain an initial assessment of touch event position via the touch sensor;
wherein the touch event mapping model maps the initial assessment of touch event position to an adjusted touch event position as a function of the data indicative of the operating condition of the electronic device, and
wherein the processor is further configured through execution of the instructions to provide the adjusted touch event position based on the touch event model and the initial touch event position.

13. The electronic device of claim 12, wherein:
the touch event mapping model is configured as a regression tree;
the touch sensor comprises an array of touch sensor elements; and
the regression tree comprises a node at which a respective branch of the regression tree is selected based on whether a respective touch sensor element of the array is activated.

14. The electronic device of claim 12, wherein:
touch event smoothing instructions are stored in the one or more memories;
the processor is configured through execution of the touch input instructions to obtain a series of past observed touch event positions;
the processor is configured through execution of the touch event smoothing instructions to determine a state of a dynamic system model based on the series of past observed touch event positions, the state being indicative of a predicted touch event position, and to provide a smoothed touch event position as a function of the predicted touch event position and a current observed touch event position; and
the processor is configured through execution of the touch event smoothing instructions to use the adjusted touch event position as the current observed touch event position.

15. The electronic device of claim 12, wherein:
the touch sensor comprises an array of touch sensor elements; and
the processor is further configured through execution of the instructions to obtain raw data for each touch sensor element of the array.

16. The electronic device of claim 15, wherein the processor is further configured through execution of the instructions to determine the adjusted touch event position based on the raw data and the initial assessment of touch event position.

17. An electronic device comprising:
a display comprising a touch sensor;
one or more memories in which touch input instructions and model-based touch event adjustment instructions are stored; and
a processor coupled to the memory, the processor configured through execution of the touch input instructions to obtain, via the touch sensor, a series of past observed touch event positions and a current observed touch event position;
wherein the processor is further configured through execution of the model-based touch event adjustment instructions to determine a state of a dynamic system model based on the series of past observed touch event positions, the state being indicative of a predicted touch event position, and to provide an adjusted touch event position as a function of the predicted touch event position and the current observed touch event position.

18. The electronic device of claim 17, wherein the state of the dynamic system model is further indicative of a predicted direction of movement for the series of past observed touch event positions and a predicted speed of movement for the series of past observed touch event positions.

19. The electronic device of claim 17, wherein the dynamic system model comprises a Kalman filter or a Hidden Markov model.

20. The electronic device of claim 17, wherein the function comprises an interpolation between the predicted touch event position and the current observed touch event position.

21. The electronic device of claim 20, wherein:
the state of the dynamic system model comprises an uncertainty parameter; and
the interpolation is weighted in accordance with the uncertainty parameter.

22. An electronic device comprising:
a display comprising a touch sensor;
one or more memories in which touch input instructions, touch event mapping instructions, and a touch event mapping model are stored; and
a processor coupled to the memory, the processor configured through execution of the touch input instructions to obtain data indicative of an initial assessment of touch event position via the touch sensor;
wherein the touch event mapping model maps the initial assessment of touch event position to an adjusted touch event position to correct for finger curvature, and
wherein the processor is further configured through execution of the touch event mapping instructions to determine the adjusted touch event position based on the touch event mapping model and the data indicative
of the initial assessment of touch event position.

* * * * *